United States Patent
Cuan et al.

(10) Patent No.: US 11,743,267 B2
(45) Date of Patent: *Aug. 29, 2023

(54) LOCATION IDENTIFICATION IN MULTI-FACTOR AUTHENTICATION

(71) Applicant: Capital One Services, LLC, McLean, VA (US)

(72) Inventors: Lukiih Cuan, McLean, VA (US); Eric Loucks, McLean, VA (US); Joshua Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,760

(22) Filed: May 10, 2022

(65) Prior Publication Data

US 2022/0272101 A1 Aug. 25, 2022

Related U.S. Application Data

(63) Continuation of application No. 16/880,111, filed on May 21, 2020, now Pat. No. 11,368,468, which is a
(Continued)

(51) Int. Cl.
*H04L 29/00* (2006.01)
*H04L 9/40* (2022.01)
(Continued)

(52) U.S. Cl.
CPC .......... *H04L 63/107* (2013.01); *H04L 9/3271* (2013.01); *H04L 63/08* (2013.01);
(Continued)

(58) Field of Classification Search
CPC ..... H04L 63/107; H04L 9/3271; H04L 63/08; H04L 2463/082; H04L 2209/56;
(Continued)

(56) References Cited

U.S. PATENT DOCUMENTS

| 8,983,868 B1 * | 3/2015 | Sehrer | G06Q 20/4016 705/1.1 |
| 9,728,077 B1 * | 8/2017 | Fu | G08B 27/003 |

(Continued)

OTHER PUBLICATIONS

Hang et al., "Where Have You Been? Using Location-Based Security Questions for Fallback Authentication", Eleventh Symposium On Usable Privacy and Security (SOUPS 2015), 2015, USENIX Association, pp. 169-183.

*Primary Examiner* — Don G Zhao
(74) *Attorney, Agent, or Firm* — Sterne, Kessler, Goldstein & Fox P.L.L.C.

(57) ABSTRACT

Disclosed herein are system, method, and device embodiments for implementing location identification in multi-factor authentication (MFA). In an example embodiment, a user service may present a geographic map based on a MFA process, and receive an authentication attempt including a geographic indicator and interaction information. Further, the system may determine whether the authentication attempt was made by a human based at least in part on the interaction information, determine whether the geographic indicator matches an expected response, and send, to an electronic device, an authentication result indicating whether geographic information was determined to be selected by a human and the geographic indicator was determined to match the expected response.

18 Claims, 5 Drawing Sheets

Related U.S. Application Data continuation of application No. 16/565,038, filed on Sep. 9, 2019, now Pat. No. 10,708,278.

(51) Int. Cl.
 *H04L 9/32* (2006.01)
 *H04W 12/64* (2021.01)
 *H04W 12/63* (2021.01)

(52) U.S. Cl.
 CPC ....... *H04L 2463/082* (2013.01); *H04W 12/63* (2021.01); *H04W 12/64* (2021.01)

(58) Field of Classification Search
 CPC .... H04L 9/3228; H04W 12/63; H04W 12/64; H04W 12/68; H04W 12/06
 See application file for complete search history.

(56) References Cited

U.S. PATENT DOCUMENTS

| | | | | |
|---|---|---|---|---|
| 9,823,817 | B1* | 11/2017 | Assali | G06F 16/7867 |
| 10,148,668 | B2* | 12/2018 | Bandi | H04L 63/0428 |
| 10,313,322 | B2* | 6/2019 | Potnuru | H04L 63/0853 |
| 10,530,784 | B2* | 1/2020 | Bandi | H04L 63/107 |
| 10,708,278 | B1 | 7/2020 | Cuan et al. | |
| 10,909,230 | B2* | 2/2021 | Vilke | H04L 9/3226 |
| 2010/0017237 | A1* | 1/2010 | Dalesandro | G06Q 30/0601 |
| | | | | 715/764 |
| 2010/0131530 | A1* | 5/2010 | Gibson | G06F 16/951 |
| | | | | 707/E17.014 |
| 2011/0320319 | A1* | 12/2011 | Streich | G06F 16/29 |
| | | | | 715/765 |
| 2012/0256723 | A1* | 10/2012 | Grover | G06F 21/31 |
| | | | | 340/5.8 |
| 2012/0291110 | A1* | 11/2012 | Park | G06F 21/6245 |
| | | | | 709/206 |
| 2013/0091452 | A1* | 4/2013 | Sorden | G06F 30/20 |
| | | | | 715/771 |
| 2013/0204940 | A1* | 8/2013 | Kinsel | G06Q 30/02 |
| | | | | 709/204 |
| 2014/0108197 | A1* | 4/2014 | Smith | G06Q 20/3223 |
| | | | | 705/26.9 |
| 2014/0189829 | A1* | 7/2014 | McLachlan | G06Q 20/4014 |
| | | | | 726/6 |
| 2014/0282973 | A1* | 9/2014 | Langley | G06F 21/36 |
| | | | | 726/7 |
| 2014/0351351 | A1* | 11/2014 | Yu | H04L 51/222 |
| | | | | 709/206 |
| 2015/0156604 | A1* | 6/2015 | Dowlatkhah | H04W 4/14 |
| | | | | 455/457 |
| 2015/0304435 | A1* | 10/2015 | Bravo | H04L 63/107 |
| | | | | 726/7 |
| 2016/0055455 | A1* | 2/2016 | Hill | G06Q 20/065 |
| | | | | 705/69 |
| 2016/0219036 | A1* | 7/2016 | Devkar | H04L 9/3226 |
| 2017/0109776 | A1* | 4/2017 | Marshak | G06Q 30/0235 |
| 2017/0330193 | A1* | 11/2017 | Tolson | G06Q 10/1095 |
| 2018/0018514 | A1* | 1/2018 | Azam | G06F 3/017 |
| 2018/0069847 | A1* | 3/2018 | Potnuru | H04L 63/08 |
| 2018/0103341 | A1* | 4/2018 | Moiyallah, Jr. | G06F 3/04842 |
| 2018/0212975 | A1* | 7/2018 | Bandi | H04L 63/0428 |
| 2018/0293669 | A1* | 10/2018 | Jackson | G06F 16/951 |
| 2018/0365024 | A1* | 12/2018 | Kiriakou | G07G 1/01 |
| 2019/0036940 | A1 | 1/2019 | Balakrishnan et al. | |
| 2019/0075120 | A1* | 3/2019 | Bandi | G06F 16/29 |
| 2019/0342754 | A1* | 11/2019 | Lucas | H04W 4/023 |
| 2020/0037162 | A1 | 1/2020 | Manikantan Shila et al. | |
| 2021/0075796 | A1 | 3/2021 | Cuan et al. | |

* cited by examiner

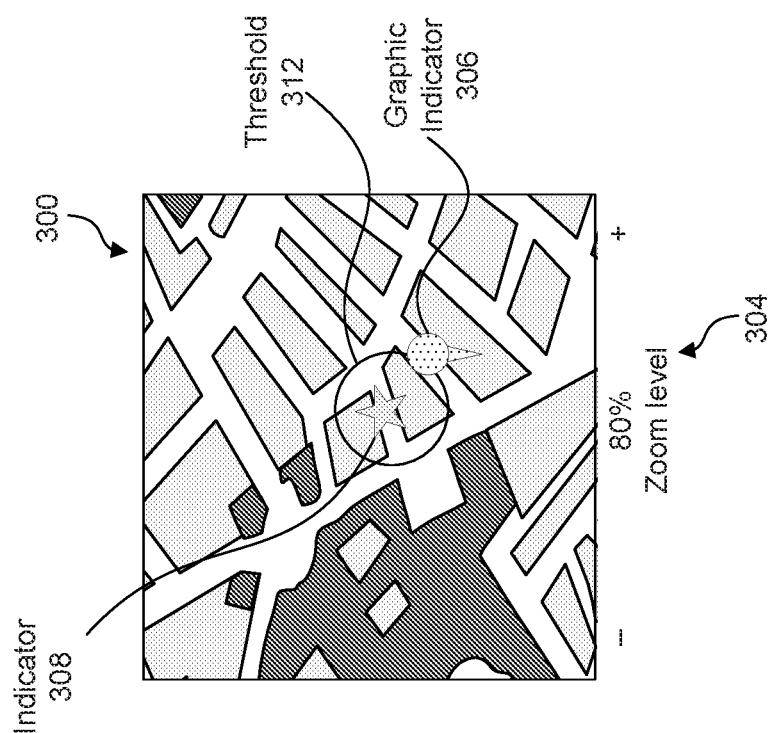
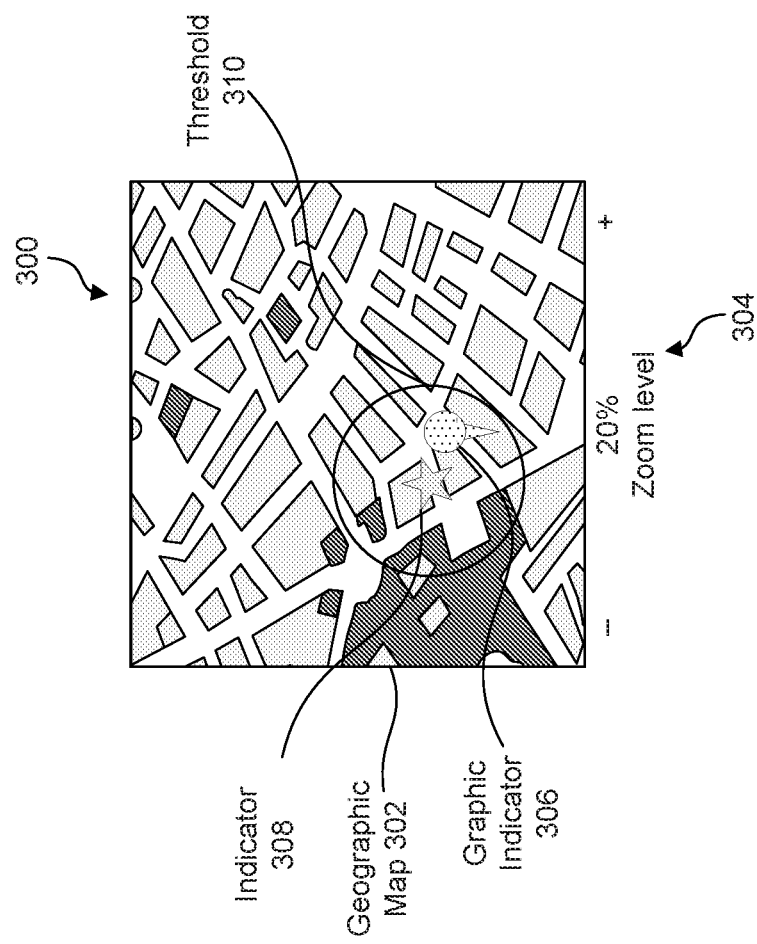
FIG. 3A
FIG. 3B

LOCATION IDENTIFICATION IN MULTI-FACTOR AUTHENTICATION

CROSS-REFERENCE TO RELATED APPLICATIONS

This application is a continuation of U.S. patent application Ser. No. 16/880,111, filed on May 21, 2020, which is a continuation of U.S. patent application Ser. No. 16/565,038 (issued as U.S. Pat. No. 10,708,278), filed on Sep. 9, 2019, all of which are incorporated herein by reference.

BACKGROUND

Many security workflows include an authentication process that verifies the identity of an entity before permitting the entity to access a digital resource. A common form of knowledge-based authentication verifies the identity of an entity by requiring the entity to provide a text-based string, and comparing the text-based string to a secret (e.g., a password, a social security number, etc.) previously provided by the entity. However, requiring an entity to provide a secret to a service provider places the secret at risk of exposure during a security breach of the service provider.

Further, text input can be very limiting as an authentication credential, e.g., text input cannot be used to determine whether the entity is a human or non-human entity impersonating a human via programmatically-generated input. One common approach for distinguishing human-input from programmatically-generated input is implementing a CAPTCHA ("Completely Automated Public Turing test to tell Computers and Humans Apart"). Typically, a CAPTCHA challenge includes a prompt that is difficult for computers to correctly answer, but relatively easy for humans. For example, a CAPTCHA challenge may request that an entity provide a response to an image recognition challenge (e.g., prompting an entity to identify an item within an image or a location within a map). Unfortunately, CAPTCHA systems are incapable of distinguishing between human entities, and/or increasingly solvable by advanced computer programs (i.e., bots) capable of providing the correct response.

BRIEF DESCRIPTION OF THE DRAWINGS

The accompanying drawings, which are incorporated herein and form part of the specification, illustrate the present disclosure and, together with the description, further serve to explain the principles of the disclosure and enable a person skilled in the relevant art to make and use the disclosure.

FIG. 3A-3B illustrates an example graphical user interface (GUI) for implementing location identification in multi-factor authentication, according to embodiments of the present disclosure.

The drawing in which an element first appears is typically indicated by the leftmost digit or digits in the corresponding reference number.

DETAILED DESCRIPTION OF THE INVENTION

Provided herein are system, apparatus, device, method and/or computer program product embodiments, and/or combinations (including sub-combinations) thereof, for implementing location identification in MFA.

As mentioned above, many authentication processes can put user secrets at risk, and fail to identify computer bots impersonating human entities. Embodiments herein address these challenges by generating authentication challenges based on location information instead of user secrets that may be exposed during a security breach, and prompting a user to provide authentication input via a map to avoid the use of deficient string credentials. Further, embodiments herein disclose determining an authentication result by verifying that the authentication input identifies the proper location within the map, and verifying that the user interaction with the map is consistent with human input.

Figure 1:
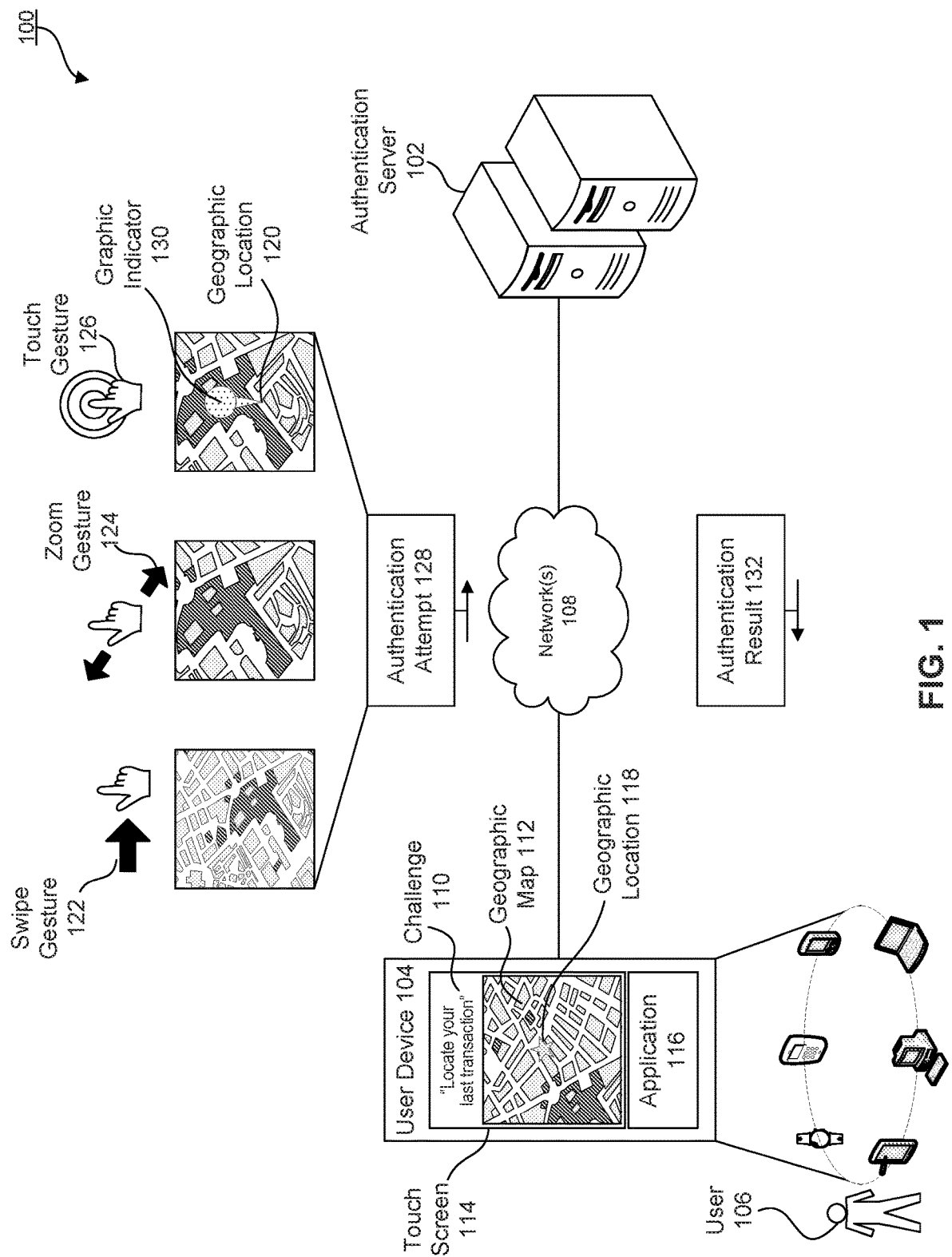
FIG. 1 is a diagram of illustrating an example process using location identification to help authenticate a person, according to embodiments of the present disclosure.

FIG. 1 illustrates a diagram of an example framework for implementing a system for location identification in MFA, according to embodiments of the present disclosure. As illustrated in FIG. 1, a computing system 100 may include an authentication service 102, and a user device 104 associated with a user 106. Further, as illustrated in FIG. 1, the authentication service 102 and the user device 104 may communicate via a communication network(s) 108. The communication network(s) 108 may include any or all of a private network, personal area network (PAN), Local-Area Network (LAN), Wide-Area Network (WAN), the Internet, or any other suitable network. Further, the connection between the authentication service 102 or the user device 104, and the communication network(s) 108 may be a wireless connection (e.g., Bluetooth, Wi-Fi connection, etc.), or a wired connection (e.g., Ethernet, universal serial bus (USB), etc.), or a combination thereof.

As used herein, in some embodiments, "authentication" may refer to a process by which an entity (e.g., a user, a device, or a process) makes their identity known to a computing system (e.g., the authentication service 102, or the user device 104). Further, authentication may be based on at least one of information an entity knows (e.g., a password, a PIN code, a digital certificate, a secret, a cryptographic key, a social security number, a zip code, a phone number, etc.), an object an entity possesses (e.g., a smart card, a hardware token, a dynamic password generator, etc.), or something an entity is (e.g., a fingerprint, a voiceprint, a retinal scan, etc.). In addition, as used herein, in some embodiments, "multi-factor authentication" may refer to an authentication process in which more than one form of authentication is used to validate the identity of an entity.

The authentication service 102 may be configured to perform an authentication process for authenticating entities within the computing system 100. For example, the authentication service 102 may authenticate the user 106 via the user device 104. Further, as described in detail herein, the authentication service 102 may implement a MFA process wherein one of the forms of authentication is a location-identification authentication process performed via an interactive map (e.g., a geographic map, a physical map, a political map, a road map, etc.). Being "interactive" means that the user 106 can direct a sequence of inputs like a mouse clicks, drag and drop actions, touch gestures, pointer positioning, and so on to the map to modify a view of the map.

In some embodiments, the location-identification authentication process may require a human to provide a geographic location via a geographic map as the response in a challenge-response authentication process. In some instances, the challenge 110 may be based on static information. For example, the challenge 110 may request that the user 106 mark a static location (e.g., the birthplace of the user 106) on a geographic map 112 displayed on a touchscreen display 114 of the user device 104. In some other instances, the challenge 110 may be based on dynamic information. For example, the challenge 110 may request that the user 106 mark a dynamic location (e.g., a merchant location where the user most recently completed a financial transaction) on the geographic map 112 displayed on the touchscreen display 114 of the user device 104. As described in detail herein, in addition to verifying whether a user has provided the correct geographic location in response to a location identification authentication challenge, the authentication service 102 may also determine whether the interaction of the user 106 with the geographic map 112 is indicative of human input or non-human input. Further, the MFA process may additionally include other forms of authentication, e.g., password-based authentication, token-based authentication, biometric authentication, etc.

Some examples of the user device 104 include, but are not limited to, tablets, smartphones, mobile devices, personal computers, laptop computers, appliances, internet of things (IoT) devices, wearables, etc. Further, as illustrated in FIG. 1, the user device 104 may include an application 116. As used herein, and in some embodiments, an "application" may refer to any computer program or software (e.g., client, agent, application, mobile application, web application, hybrid application, computer program, desktop application, or module) operable to run on the user device 104.

For example, the application 116 may be a mobile banking application employed by the user 106 to manage a financial account associated with the authentication service 102. Further, the application 116 may require that the user 106 authenticate to the authentication service 102 before performing any actions with respect to the financial account. As such, the authentication service 102 may cause the user device 104 to display the challenge 110 and an initial geographic location 118 on the geographic map 112 on the touchscreen display 114. As an example, the challenge 110 may request that the user 106 select the location of their most recent payment transaction. Further, the user device 104 may capture the interaction of the user 106 with the geographic map 112 while the user 106 selects a geographic location 120 in response to the challenge 110.

As an example, the user 106 may perform a series of gestures to navigate from a first geographic location 118 to a second geographic location 120 (i.e., the geographic location the user 106 would like to identify as the response to the challenge), and perform at least one gesture to select the second geographic location 120 within the geographic map 112. Some examples of gestures include a single touch gesture, a multi-tap gesture, a swipe (moving one or more fingers across display), or a circle (lasso) on the touchscreen display 114.

As illustrated in FIG. 1, the user 106 may perform a swipe gesture 122 to manipulate the interactive geographic map 112 to display the second geographic location 120 adjacent to the first geographic location 118. In addition, the user 106 may perform a zoom gesture 124 to magnify the visual representation of the second geographic location 120 on the touchscreen display 114. Further, the user 106 may perform a touch gesture 126 to drop a graphical indicator 130 (e.g., a pin) on the second geographic location 120 within the geographic map 112. Additionally, or alternatively, in some embodiments, the user 106 may select the second geographical location 120 using any other form of user input (e.g., a mouse input, a keyboard input, etc.) capable of identifying a location on the geographic map 112.

The user device 104 may send the authentication attempt 128 to the authentication service 102. The authentication attempt 128 may include the gestures (i.e., the swipe gesture 122, the zoom gesture 124, the touch gesture 126), and an identifier of the selected geographic location 120. Upon receipt of the authentication attempt 128, the authentication service 102 may determine whether the selected geographic location 120 matches an expected geographic location corresponding to the challenge 110.

Further, the authentication service 102 may determine whether the gestures 122, 124, and 126 are consistent with interaction by a human with the geographic map 112. For example, the authentication service 102 may determine that the gestures 122, 124, and 126 correspond to human input based on the gestures 122, 124, and 126 not matching previously-submitted authentication input, or any patterns corresponding to previously-submitted authentication input. Additionally, or alternatively, the authentication service 102 may determine that the gestures 122, 124, and 126 correspond to human input based on the gestures 122, 124, and 126 not exactly matching the expected response.

If the selected geographic location 120 matches the expected geographic location within a predetermined threshold, and the gestures are consistent with input by a human, the authentication service 102 may determine that the user 106 has successfully passed the location identification factor of the MFA process. Further, the authentication service 102 may send the authentication result 132 to the application 116. In some embodiments, the application 116 may permit the user 106 to perform financial transactions based on the authentication result 132. For instance, the application 116 may permit the user 106 to view an account balance based at least in part on the authentication result 132 indicating that the user 106 successfully authenticated to the authentication service 102.

Figure 2:
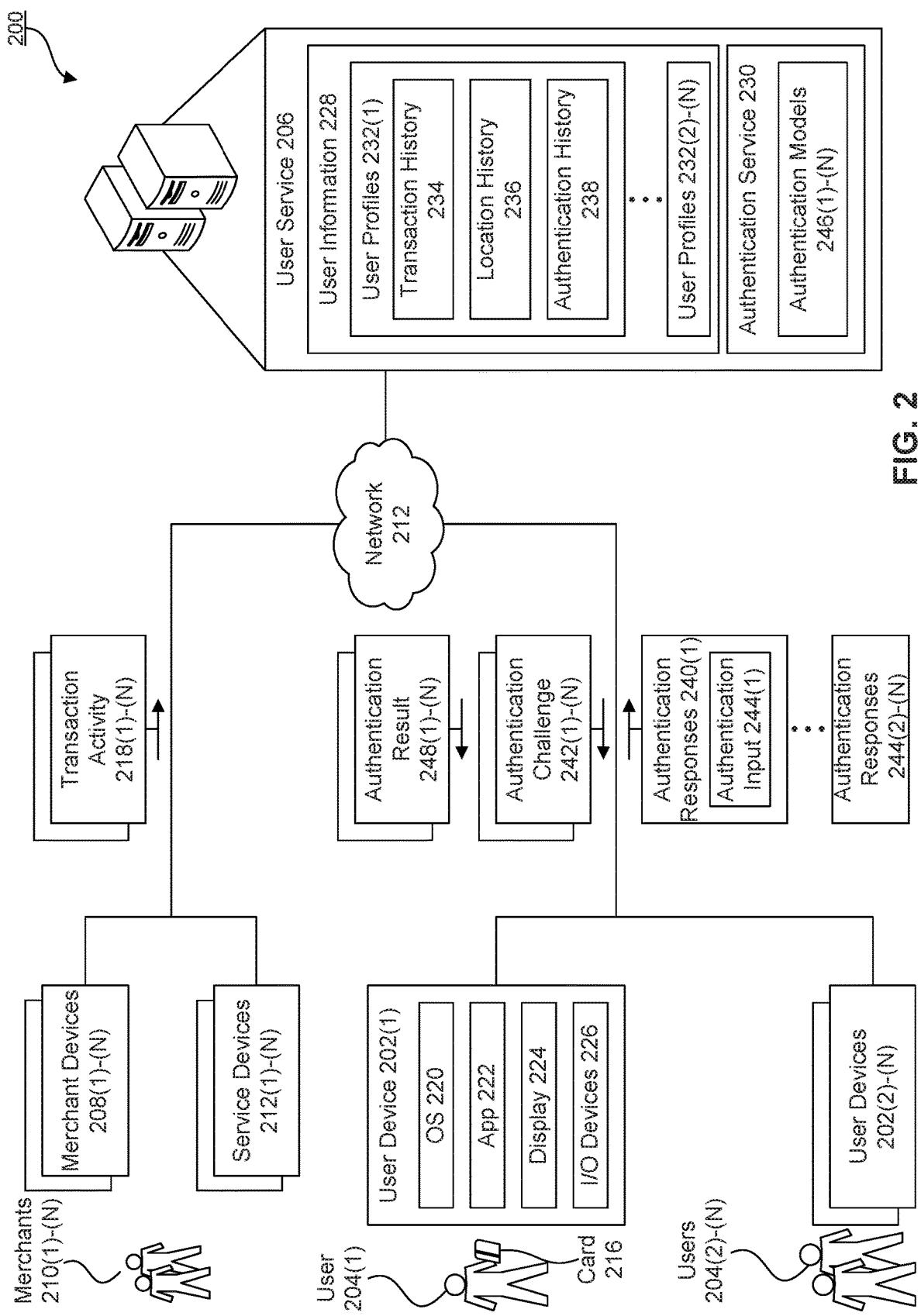
FIG. 2 is a block diagram of an example framework for implementing a location identification factor in multi-factor authentication (MFA), according to embodiments of the present disclosure.

FIG. 2 illustrates a block diagram of an example framework for implementing a system for location identification in MFA, according to some embodiments of the present disclosure. As illustrated in FIG. 2, a computing system 200 may include a plurality of user devices 202(1)-(N) (e.g., the user device 104) associated with a plurality of users 204(1)-(N) (e.g., the user 106), a user service 206, a plurality of merchant devices 208(1)-(N) associated with a plurality of merchants 210(1)-(N), and a plurality of service devices 212(1)-(N). Further, as illustrated in FIG. 2, the user devices 202(1)-(N), the user service 206, the merchant devices 208(1)-(N), and the service devices 212(1)-(N) may communicate via a communication network(s) 214.

The communication network(s) 214 may include any or all of a private network, personal area network (PAN), Local-Area Network (LAN), Wide-Area Network (WAN), the Internet, or any other suitable network. Further, the connection between the user devices 202(1)-(N), the user service 206, the merchant devices 208(1)-(N), or the service devices 212(1)-(N), and the communication network(s) 214 may be a wireless connection (e.g., Bluetooth, Wi-Fi connection, etc.), or a wired connection (e.g., Ethernet, universal serial bus (USB), etc.), or a combination thereof.

In some embodiments, each user device 202 is associated with a user 204. For instance, the user 204(1) may employ the user device 202(1), the user 204(N) may employ the user device 202(N), and so forth. Some examples of the user devices 202(1)-(N) include, but are not limited to, tablets, smartphones, mobile devices, personal computers, laptop computers, appliances, IoT devices, wearables, etc. Further, as described in detail herein, the users 204(1)-(N) may employ the user devices 202(1)-(N) to access resources of the user service 206, merchant devices 208(1)-(N), or the service devices 212(1)-(N) via the network 214.

The merchant devices 208(1)-(N) may be configured to perform financial transactions using financial accounts associated with the users 204(1)-(N). Some examples of the merchant devices 208(1)-(N) include, but are not limited to, kiosks, point of sale stations, personal computers, laptop computers, smartphones, tablets, appliances, IoT devices, wearables, etc.

For instance, the user 204(1) may purchase a retail item from the merchant 210(1). Further, the merchant 210(1) may employ the merchant device 208(1) (e.g., a point of sale station) to process a payment transaction for the retail item using a payment card 216 issued by a financial institution to the user 204(1). In some embodiments, the payment card 216 may be a credit card or a debit card for performing financial transactions using a financial account of the user 204(1). In response to a payment interaction between the payment card 216 and the merchant device 208(1), the merchant device 208(1) may send transaction activity 218(1) to the user service 206. In some embodiments, the transaction activity 206(1) may include a user identifier identifying the user 204(1), a merchant identifier identifying the merchant 210(1) and the merchant device 208(1), payment details indicating a payment amount of the retail item, a location of the merchant device 208(1) or the payment transaction, a merchant category associated with the merchant 210(1), a transaction type associated with the payment transaction, a payment instrument identifier identifying the type of payment instrument used by the user 204(1) to perform the payment transaction, a date and time of the payment transaction, authentication information provided during the payment transaction, etc.

The service devices 212(1)-(N) may be computing devices associated with the user service 206. For example, the service devices 212(1)-(N) may be located remote from the service device 206, and assist the operations of the user service 206. Some examples of the service devices 212(1)-(N) include, but are not limited to, tablets, smartphones, mobile devices, personal computers, laptop computers, web servers, kiosks, point of sale stations, automated teller machines (ATMs), appliances, internet of things (IoT) devices, wearables, etc. Further, the service devices 212(1)-(N) may be configured to provide a service to the users 204(1)-(N), and send the transaction activity 218(1)-(N) to the user service 206. In addition, the transaction activity 218(1)-(N) may include log information describing the interactions between the service devices 212(1)-(N), and the user devices 202(1)-(N) and/or the users 204(1)-(N). Some examples of a service include a financial service, a content distribution service, data storage service, a social network, etc.

For example, the user service 206 may be a financial services platform, and the service device 212(1) may be an ATM configured to facilitate financial transactions by users 204(1)-(N) having a financial account with the user service 206. Some examples of financial transactions that may be performed using the ATM can include currency withdrawals (e.g., cash withdrawals, cryptocurrency withdrawals, etc.), currency deposits (e.g., cash deposits, cryptocurrency deposits, etc.), transfer of funds (e.g., transferring from a first financial account to a second account), obtaining financial account information, checking a financial account balance, printing checks, printing account statements, printing money orders, etc. Further, the server device 212(1) may send transaction activity 218(2) to the user service 206. In some embodiments, the transaction activity 218(2) may include a transaction record describing a financial transaction performed at the service device 212(1), a location of the service device 212(1), a type of user device 202(1) used to perform the financial transaction, a time and date of the financial transaction, authentication information provided during the financial transaction, etc.

As another example, the service device 212(2) may be an electronic device associated with a customer representative or a chatbot. Further, the service device 212(2) may collect customer service information corresponding to customer service interactions with the users 204(1)-(N). For instance, the service device 212(2) may record a date and time of a customer service interaction, a location of the user 204(1) during a customer service interaction, and customer service notes associated with a customer service interaction. Further, the service device 212(2) may be configured to send the recorded information as transaction activity 218(3) to the user service 206.

As illustrated in FIG. 2, the user device 202(1) may include an operating system 220(1), an application 222(1) (e.g., the application 116), a display 224(1) (e.g., a touch screen), and input/output (I/O) devices 226(1) (e.g., a camera, a speaker, sensors, etc.). The operating system 220(1) may be an application program configured to manage the basic functions of the user device 202(1). The operating system 220(1) may be configured to schedule tasks, manage storage of data on the user device 202(1), provide common services to the components and applications of the user device 202(1), or communicate with peripheral devices associated with the user device 202(1). Further, in some embodiments, the application 222(1) may be configured to execute on the operating system 220(1).

For example, the user device 202(1) may be a mobile device, the user service 206 may be a web platform of a financial service, and the application 222(1) may be a mobile banking application. Further, the application 222(1) may be configured to monitor an account balance of a financial account of the user 204(1), transfer funds to and from a financial account of the user 204(1), electronically pay bills, or locate the service devices 212(1)-(N) (e.g., an ATM). Further, in some embodiments, the application 222(1) may request that the user 204(1) perform a MFA process via the user service 206 prior to using the application 222(1). Additionally, or alternatively, the operating system 222(1) may request that the user 204(1) perform a MFA process via the user service 206 prior to using the operating system 220(1) or the application 222(1).

In some embodiments, the user service 206 may be an application server, a service provider, a web site, a web application, or a web platform. For example, the user service 206 may be a web platform of a financial institution that provides financial services to the users 204(1)-(N). As another example, the user service 206 may offer authentication as a service, and authenticate the users 204(1)-(N) on behalf of clients.

As illustrated in FIG. 2, in some embodiments, the user service 206 may include user information 228 and an authentication service 230 (e.g., the authentication service 102). The user information 228 may include user data associated with the users 204(1)-(N). Further, the user information 228 may include user profiles 232(1)-(N) (e.g., user accounts) associated with the users 204(1)-(N). For example, the first user profile 232(1) is associated with the first user 204(1), the Nth user profile 232(N) is associated with the Nth user 204(N), and so forth. In some instances, the user profiles 232 may include authentication information, authorization information, encryption information, user preferences, location information, biographical information, demographic information, special needs and disabilities, executed service agreements, contact information, usage history, etc. Further, the authentication information may include location secrets, location secret challenge information, anti-phishing locations, PIN codes, username/password combinations, cryptographic information, biometric information (e.g., voice signatures, fingerprints, retinal or iris information, and facial information), etc. In some embodiments, the user service 206 may be a web platform of a financial institution, and the user profiles 232(1)-(N) may be financial accounts including account balance information, financial transaction history, transaction location information, user activity, user roles, user workflows, user settings, etc. Further, the user service 206 may update the user information 228 based on the transaction activity 218(1)-(N) received from the merchant devices 208(1)-(N), the service devices 212(1)-(N), and the user devices 202(1)-(N).

In some embodiments, the user profiles 232(1)-(N) may be organized into transaction history 234(1)-(N), location history 236(1)-(N), and authentication history 238(1)-(N). For example, the user profile 232(1) may include transaction history 234(1) including a record of transactions associated with the user 204(1), location history 236(1) including a log of locations visited by the user 204(1), and authentication history 238(1) including a log of authentication attempts by the user 204(1). Further, the user service 206 may update the user profiles 232(1)-(N) based at least in part on the transaction activity 218(1)-(N). For instance, the user service 206 may receive the transaction activity 218(1) indicating that the user 204(1) purchased the retail item from the merchant 210(1). In addition, the user service 206(1) may update the transaction history 234(1) to reflect the purchase of the retail item, and the location history 236(1) to reflect that the user 204 visited the location of the merchant device 208(1) at the date and time the purchase was completed.

Further, the users 204(1)-(N) may provide the user information 228 to the user service 206. In some embodiments, the user service 206 may request a location secret from the user 204(1) during a registration or an administrative process. Further, the user service 206 may assign the location secret to the user 204(1), and use the location secrets to verify authentication responses 240(1) received from the user device 202(1) in a MFA process.

For example, the user service 206 may request that the user 204(1) identify a favorite dining establishment of the user 204(1) as a location secret, receive a selection of the favorite dining establishment of the user 204(1), determine geographic information (e.g., geographic coordinates) associated with selected location, and compare the determined geographic information to geographic information received during a MFA process. In some instances, the user 204(1) may identify the location secret as a geofence around a location on a map. For example, the user 204(1) may form a geofence around the dining establishment while excluding adjacent dining establishments in a shared food court. As used herein, in some embodiments, a "geofence" may refer to a virtual geographic boundary.

In some other embodiments, the user service 206 may request location secret challenge information from the user 204(1) during a registration or an administrative process. Further, the user service 206 may store the location secret challenge information, and use the location secret challenge information to verify authentication responses 240 in a MFA process. For example, the user service 206 may request that the user 204(1) select a location-based challenge to be used during an MFA process, receive a selection of a location-based challenge, present the location-based challenge during a MFA process, dynamically determine an answer to the location-based challenge based on the user information 228, and compare the determined answer to geographic information received during the MFA process.

As described in detail herein, the authentication service 230 may perform a MFA process wherein one of the forms of authentication is a location-identification authentication process performed via an interactive map. For example, to use the application 222(1), the application 222(1) may require that the user 204(1) authenticate to the application 222(1) via the authentication service 230. As such, the authentication service 230 may send an authentication challenge 242(1) to the user device 202(1). In some embodiments, the authentication challenge 242(1) may include a static challenge associated with a static location, or a dynamic challenge with an answer that changes with activity by the user 204(1).

For instance, the authentication challenge 242(1) may request that the user 106 mark a static location (e.g., the birthplace of the user 204(1)), or a dynamic location (e.g., the location of a merchant associated with the most recent transaction of the user 204(1)) on a map presented on the display 224. Further, the authentication challenge 242(1) may include a location identifier identifying a starting location of the map. In some embodiments, the starting location may be an anti-phishing location selected by the user 204(1) that indicates to the user 204(1) that the authentication challenge 242(1) is associated with the user service 206 and not a malicious actor.

Upon receipt of the authentication challenge 242(1), the user device 202(1) may display the map and challenge to the user 204(1) via the display 224(1). For instance, the application 222(1) may display a geographic map (e.g., the geographic map 112) including the starting location of the authentication challenge 242(1), and challenge text (e.g., the challenge 110) requesting the user 204(1) to identify a specified location within the geographic map. Additionally, or alternatively, the user device 202(1) may present the challenge to user 204(1) using the I/O devices 226(1). For example, the mobile device 202(1) may reproduce an audio notification requesting the user 204(1) to identify a specified location within the geographic map.

Further, the user device 202(1) may capture the authentication input 244(1) to the geographic map during the selection of the geographic location corresponding to the authentication challenge 242(1) by the user 204(1). Some examples of authentication input 244(1) include touch gestures, keyboard input, mouse input (e.g., a mouse scroll, a point and click, etc.), sensor input (e.g., gyroscope input, accelerometer input, proximity sensor input, etc.), or any other input via the I/O devices 226(1). For instance, the user 204(1) may perform a swipe gesture (e.g., the swipe gesture 122) to navigate from the starting location to a destination location within the map, a zoom gesture (e.g., the zoom gesture 124) to magnify the visual representation of the destination location within the map, and a touch gesture 126 to drop a graphical indicator 130 (e.g., the pin) on the destination location within the map.

Further, the user device 202 may send the authentication response 240(1) including the authentication input 244(1) to the authentication service 230. In some embodiments, the authentication response 240(1) may further include map status information indicating the zoom level of the map. Upon receipt of the authentication response 240(1), the authentication service 230 may verify the authentication input 244(1) based at least in part on the user information 228 and the authentication models 246. The verification process may include determining whether the destination location matches the authentication challenge 242(1), and whether the authentication input is indicative of human input as opposed to automated input by a computer program.

For example, the authentication service 230 may identify the expected response to the authentication challenge 242(1), and compare the expected response to the authentication input 244(1). In some embodiments, the authentication service 230 may determine the expected response from the transaction history 234 or the location history 236. For instance, the authentication challenge 242(1) may request that the user 204(1) identify the location of the last transaction using the payment card 216 on an interactive geographic map. As such, the authentication service 230 may search the transaction history 234(1) for the most recent transaction using the payment card 216, and determine the location of the most recent transaction based upon the transaction history 234(1) or the location history 236(1). Further, the authentication service 230 may determine expected response coordinates corresponding to the determined location via a geocoding function, and authentication attempt coordinates corresponding to the location identified in the authentication input 244(1) via a geocoding function. In addition, the authentication service 230 may determine whether the expected response coordinates match the authentication attempt coordinates.

In some embodiments, the authentication service 230 may determine that the authentication attempt coordinates are correct based at least in part on the distance between the expected response coordinates and the authentication attempt coordinates being less than a predetermined threshold (e.g., three meters). Further, in some instances, as described in further detail in FIG. 3, the predetermined threshold may be based on the zoom level of the map at the time that the user 204(1) selects the destination location.

Additionally, or alternatively, the authentication service 230 may determine whether the authentication attempt coordinates fall within a geofence associated with the expected response coordinates. In some instances, the geofence may permit a first predetermined threshold distance between the expected response coordinates and the authentication attempt coordinates in a first direction, and a second predetermined threshold between the expected response coordinates and the authentication attempt coordinates in a second direction.

Further, the authentication service 230 may determine whether the authentication inputs 244(1)-(N) are indicative of human input. In some embodiments, the authentication service 230 may determine whether the authentication inputs 244(1)-(N) are indicative of a replay attack based on the authentication history 238. For instance, the authentication service 230 may determine whether the authentication input 244(2) is a replay attack based at least in part on the authentication input 244(2) matching previously-submitted authentication input 244(1) for the authentication challenge 242(1) within a predetermined threshold. As an example, the authentication service 230 may identify previously-determined authentication attempt coordinates that were used during a successful authentication attempt within the authentication history 234, and compare the previously-determined authentication attempt coordinates to the current authentication attempt coordinates. If the previously-determined authentication attempt coordinates and the current authentication attempt coordinates are exactly the same, the authentication service 230 may determine that the authentication response 240(1) was not provided by a human. As another example, if one or more gestures of the authentication input 244(2) match one or more gestures of previously-submitted authentication input 244(1), the authentication service 230 may determine that the authentication response 240(2) was not provided by a human. As yet still another example, if the path from the starting point to the destination point in the authentication input 244(2) matches the path from the starting point to the destination point in the previously-submitted authentication input 244(1), the authentication service 230 may determine that the authentication response 240(2) was not provided by a human.

In some embodiments, the authentication service 230 may determine whether the authentication inputs 244(1)-(N) are indicative of non-human input based at least in part on a specificity of the authentication inputs 244(1)-(N). For example, the authentication service 230 may determine that the authentication input 244(1) is non-human input based at least in part on the expected response coordinates and the authentication attempt coordinates being identical or near-identical (e.g., the difference between the expected response coordinates and the authentication attempt coordinates being negligible). As another example, the authentication service 230 may determine that the authentication input 244(1) is non-human input based at least in part on the input being provided via geographic coordinates.

Further, the authentication service 230 may determine whether the authentication inputs 244(1)-(N) are indicative of non-human input based on one or more attributes of the authentication inputs 244(1)-(N). Some examples of attributes of the authentication inputs 244(1)-(N) include a pattern of user input, a precision of user input, a duration of user input, an efficiency of user input, gesture types within the user input, an amount of gestures within the user input, etc. For example, the authentication service 230 may determine that the path from the starting point to the destination point is indicative of human input based upon the type of gestures employed by the user 204(1) to navigate the map.

In some embodiments, the authentication models 246 may classify the authentication inputs 244(1)-(N) as human input or non-human input. In some embodiments, the authentication models 246 may employ machine learning techniques and/or pattern recognition techniques to classify the authentication inputs 244(1)-(N). Further, the authentications models 246 may include hidden Markov models, decision trees, regression models, support vector machines, or artificial neural networks for determining whether the authentication inputs 244(1)-(N) are most likely human input or non-human input. Further, the authentication service 230 may train the authentication models 246(1)-(N) using the authentication history 238.

Further, in some embodiments, the authentication service 230 may employ the authentication models 246 to determine the authentication challenges 242(1)-(N). For instance, the authentication service 230 may use the authentication models 246(1)-(N), transaction history 234(1), and location history 236(1) to identify a preferred location of the user 204(1) for performing an activity. As an example, the authentication model 246(1) may identify a restaurant as the favorite breakfast diner of the user 204(1) based upon frequent and consistent payment transactions for food at the diner in the morning. Further, the authentication service 230 may generate an authentication challenge 242(1) requesting the user 204(1) to identify the location of their favorite breakfast diner, and set the expected response to the authentication challenge 242(1) to the location of the breakfast diner.

Further, the authentication service 230 may send the authentication results 248(1)-(N) to the user devices 202(1)-(N). For example, if the authentication service 230 determines that the destination location of the authentication input 244 matches the authentication challenge 242(1), and authentication input 244(1) is indicative of human input, the authentication service 230 may send the authentication result 248(1) to the user application 222. Further, the authentication result 248(1)-(N) may indicate that the user 204(1) has successfully completed the location based factor of an MFA process.

If the authentication service 230 determines that the destination location of the authentication input 244(1) does not match the expected response associated with the authentication challenge 242(1), or the authentication input 244(1) is indicative of non-human input, the authentication service 230 may send an authentication result 248(1) indicating that user 204(1) has failed the location based factor of an MFA process. Alternatively, in some embodiments, if the authentication service 230 determines that the destination location of the authentication input 244 matches the authentication challenge 242(1) but the authentication input 244(1) is indicative of non-human input, the authentication service 230 may send the authentication result 248(1) indicating that the user device 202(1) or user 204(1) should be granted limited access, or required to pass an additional factor in an MFA process.

FIGS. 3A-3B illustrate an example GUI 300 for implementing location identification in MFA, according to embodiments of the present disclosure.

As described in detail above, authentication service 230 may employ a dynamic threshold when verifying the authentication inputs 244(1)-(N) received from the user devices 202(1)-(N). For example, the authentication service 230 may determine that the authentication attempt coordinates corresponding to the authentication input 244(1) are correct based on the distance between the expected response coordinates and the authentication attempt coordinates being less than a dynamic threshold. Further, the authentication service 230 may dynamically modify the threshold based at least in part on a magnification state of the geographic map used in the location based factor of an MFA process. In some embodiments, the users 204(1)-(N) may modify the magnification state of the geographic map to adjust the view presented by the geographic map.

As illustrated in FIGS. 3A-3B, the GUI 300 may include a geographic map 302, a magnification control 304, and a graphic indicator 306 identifying the destination location selected by the user 204(1). In addition, for illustrative purposes, FIGS. 3A-3B show an indicator 308 identifying the expected response to the location identification challenge represented in GUI 300. Referring to FIG. 3A, in some embodiments, the authentication service 230 may apply a first dynamic threshold 310 for verifying the destination location with respect to the expected response when the magnification control 304 is set to a first magnification level. Further, referring to FIG. 3B, in some embodiments, the authentication service 230 may apply a second dynamic threshold 312 that is smaller than the first dynamic threshold based at least in part on increasing the magnification level of the magnification control 304. As illustrated in FIGS. 3A-3B, the destination location selected by the user 204(1) may be considered to match the expected response at a first magnification level of the magnification control 304 based on the threshold 310, while not matching the same expected response at a second magnification level of the magnification control 304 based on the threshold 312.

Figure 4:
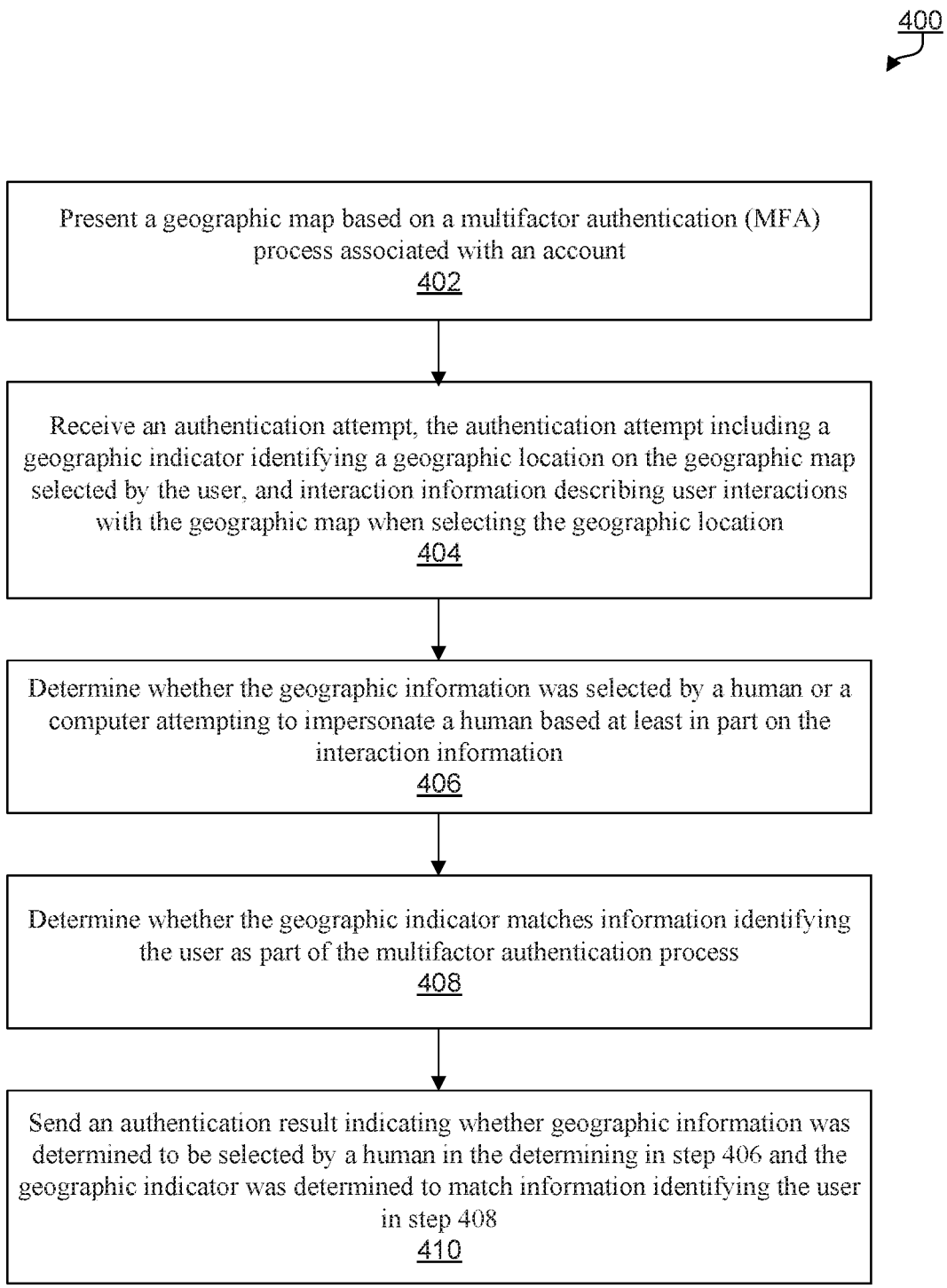
FIG. 4 is a flowchart illustrating a process implemented by a system for implementing location identification in multi-factor authentication, according to embodiments of the present disclosure.

FIG. 4 is a flowchart illustrating a process for implementing location identification in MFA, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed in all embodiments. Further, some of the steps may be performed simultaneously, or in a different order than shown in FIG. 4, as will be understood by a person of ordinary skill in the art.

Method 400 shall be described with reference to FIGS. 1, 2, and 3A-3B. However, method 400 is not limited to those example embodiments.

In 402, a system may present, via an electronic device, a geographic map based on a multi-factor authentication (MFA) process associated with an account. For example, the user 204(1) may endeavor to utilize the application 222. As such, the user 204(1) may be required to authenticate via a MFA process managed by the authentication service 230. A first factor of the MFA process may require the user 204(1) to provide a username-password combination associated with an account of the user 204(1) with the user service 206.

Further, a second factor of the MFA process may be a location identification based factor. For instance, the authentication service 230 may send the user device 202(1) the authentication challenge 242(3) including the challenge 110. Upon receipt of the authentication challenge 242(3), the user device 202(1) may present the challenge 110 and a geographic map 112 via the display 224. The challenge 110 may be a static challenge or dynamic challenge, and requires the user 204(1) to identify a location within the geographic map 112. Further, the challenge 110 may be based on user information 228 associated with the user 204(1). For instance, the challenge 110 may be pre-selected by the user 204(1) during an administrative process (e.g., a registration process). In some other instances, the authentication service 230 may dynamically determine the challenge based upon the user profile 232(1). For example, the authentication service 230 may determine that it has location history 236(1) pertaining to the user 204(1), and set the challenge 110 to a request for a recent location of the user 204(1). As another example, the authentication service 230 may determine that it has transaction history 234(1) pertaining to the user 204(1), and set the challenge to a request for a location of the user 204(1) during a transaction or series of transactions involving the user 204(1).

Further, in some embodiments, the authentication service 230 may employ the authentication models 246 to determine the challenge 110. For example, the authentication service 230 may use the authentication models 246(1)-(N) to identify a preferred location of the user 204(1) for performing an activity based upon the location history 236 or transaction history 234, and set the challenge to a request for the user 204(1) to identify the preferred location.

In 404, the system may receive, from the electronic device, an authentication attempt, the authentication attempt including a geographic indicator identifying a geographic location on the geographic map selected by the user, and interaction information describing user interactions with the geographic map when selecting the geographic location. For example, the authentication service 230 may receive the authentication response 240(3) from the user device 202(1). Further, the authentication response 240(3) may include the authentication input 244(3) which includes a location identifier identifying a location selected by the user 204(1) as the response to the challenge 110, a log of one or more gestures (e.g., the gestures 122, 124, and 126) used to navigate from the starting location 118 of the geographic map 112 to the destination location 120 of the geographic map 112, and the magnification level of a magnification control 304. In some embodiments, the user device 202(1) may send the authentication response 240(1) in a single communication packet. In some other embodiments, the user device 202(1) may stream the authentication response 240(1) in a plurality of communication packets each including authentication input 244(1) received from the user 204(1).

In 406, the system may determine whether the geographic information was selected by a human or a computer attempting to impersonate a human based at least in part on the interaction information. For example, the authentication service 230 may determine that the authentication input 244(3) corresponds to human input based on the authentication input 244(3) not matching previously-submitted authentication inputs 244(1)-(2), or any patterns corresponding to previously-submitted authentication inputs 244(1)-(2). Additionally, or alternatively, the authentication service 230 may determine that the authentication input 244(3) corresponds to human input based on the authentication input 244(3) not exactly matching the expected response. In some embodiments, the authentication service 230 may employ the authentication models 246 authentication models 246(1)-(N) to classify the authentication input 244(3) as human input.

In 408, the system may determine whether the geographic indicator matches information identifying the user as part of the multi-factor authentication process. For example, the authentication service 230 may determine geographic coordinates corresponding to the destination location identified in the authentication input 244(3), and geographic coordinates corresponding to the expected response to the challenge 110. Further, the authentication service 230 may determine that the geographic coordinates corresponding to the destination location match the geographic coordinates corresponding to the expected response within a threshold. As described in detail above with respect to FIGS. 3A-3B, the threshold may be dynamically modified based at least in part on a magnification level of the geographic map 112.

In 410, the system may send, to the electronic device, an authentication result indicating whether geographic information was determined to be selected by a human in the determining in step 406 and the geographic indicator was determined to match information identifying the user in step 408. For example, the authentication service 230 may send the authentication result 248(3) to the application 222. Further, the authentication result 248(3) may indicate that the user 204(1) has been successfully authenticated, or successfully passed the location identification factor of the MFA process. As a result, the user 204(1) may be permitted to use the application 222.

Figure 5:
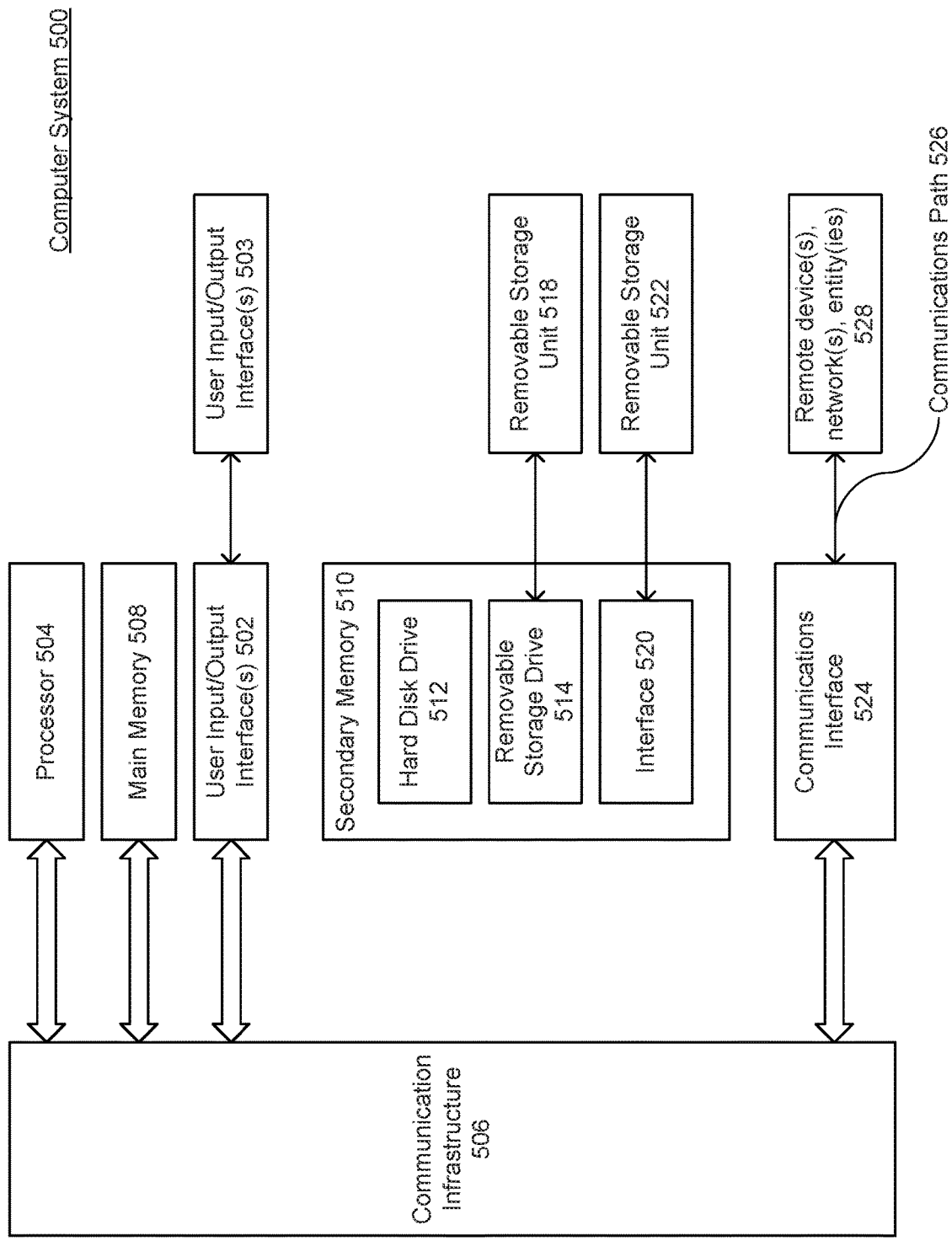
FIG. 5 illustrates a computer system, according to example embodiments of the present disclosure.

FIG. 5 is a block diagram of example components of system 500. To implement one or more example embodiments, one or more systems 500 may be used, for example, to implement embodiments discussed herein, as well as combinations and sub-combinations thereof. System 500 may include one or more processors (also called central processing units, or CPUs), such as a processor 504. Processor 504 may be connected to a communication infrastructure or bus 506.

System 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

System 500 may also include a main or primary memory 508, such as random access memory (RAM). Main memory 508 may include one or more levels of cache. Main memory 508 may have stored therein control logic (i.e., computer software) and/or data.

System 500 may also include one or more secondary storage devices or memory 510. Secondary memory 510 may include, for example, a hard disk drive 612 and/or a removable storage device or drive 514.

Removable storage drive 514 may interact with a removable storage unit 518. Removable storage unit 518 may include a computer usable or readable storage device having stored thereon computer software (control logic) and/or data. Removable storage unit 518 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 514 may read from and/or write to removable storage unit 518.

Secondary memory 510 may include other means, devices, components, instrumentalities or other approaches for allowing computer programs and/or other instructions and/or data to be accessed by system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

System 500 may further include a communication or network interface 524. Communication interface 524 may enable system 500 to communicate and interact with any combination of external devices, external networks, external entities, etc. (individually and collectively referenced by reference number 528). For example, communication interface 524 may allow system 500 to communicate with external or remote devices 528 over communications path 526, which may be wired and/or wireless (or a combination thereof), and which may include any combination of LANs, WANs, the Internet, etc. Control logic and/or data may be transmitted to and from system 500 via communication path 526.

System 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms. In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, system 500, main memory 508, secondary memory 510, and removable storage units 518 and 522, as well as tangible articles of manufacture embodying any combination of the foregoing. Such control logic, when executed by one or more data processing devices (such as computer system 600), may cause such data processing devices to operate as described herein.

It is to be appreciated that the Detailed Description section, and not Abstract section, is intended to be used to interpret the claims. The Abstract section may set forth one or more but not all example embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Identifiers, such as "(a)," "(b)," "(i)," "(ii)," etc., are sometimes used for different elements or steps. These identifiers are used for clarity and do not necessarily designate an order for the elements or steps.

The breadth and scope of the present invention should not be limited by any of the above-described example embodiments, but should be defined only in accordance with the following claims and their equivalents.

What is claimed is:

1. A computer-implemented method for authenticating an electronic device, the method comprising:
   (a) presenting, via the electronic device, a geographic map with a challenge based on a multi-factor authentication (MFA) process to log into an account, the challenge requiring a user to provide authentication input via the geographic map by marking a particular geographic location on the geographic map;
   (b) receiving, from the electronic device, a geographic indicator marking the particular geographic location selected by the user;
   (c) authenticating the electronic device based on the geographic indicator matching an expected response based on the geographic indicator being within a dynamic threshold that is based on a magnification level; and
   wherein the dynamic threshold is a computer-implemented geofence around the expected response.

2. The computer-implemented method of claim 1, further comprising setting the dynamic threshold based on the magnification level selected by the user.

3. The computer-implemented method of claim 2, wherein the magnification level is set by the user via a graphical user interface (GUI) presented on the electronic device.

4. The computer-implemented method of claim 3, further comprising applying a further dynamic threshold based on an increased magnification level.

5. The computer-implemented method of claim 1, wherein the matching in (c) is based on a distance between coordinates corresponding to the expected response and the geographic indicator being within the dynamic threshold.

6. The computer-implemented method of claim 1, wherein the geofence is smaller when the magnification level is increased.

7. A non-transitory computer readable medium including instructions for authenticating an electronic device that when processed by a computing system cause the computing system to perform operations comprising:
   (a) presenting, via the electronic device, a geographic map with a challenge based on a multi-factor authentication (MFA) process to log into an account, the challenge requiring a user to provide authentication input via the geographic map by marking a particular geographic location on the geographic map;
   (b) receiving, from the electronic device, a geographic indicator marking the particular geographic location selected by the user;
   (c) authenticating the electronic device based on the geographic indicator matching an expected response based on the geographic indicator being within a dynamic threshold that is based on a magnification level;
   wherein the dynamic threshold is a computer-implemented geofence around the expected response.

8. The non-transitory computer readable medium of claim 7, wherein the operations further comprise setting the dynamic threshold based on the magnification level selected by the user.

9. The non-transitory computer readable medium of claim 8, wherein the magnification level is set by the user via a graphical user interface (GUI) presented on the electronic device.

10. The non-transitory computer readable medium of claim 9, wherein the operations further comprise applying a further dynamic threshold based on an increased magnification level.

11. The non-transitory computer readable medium of claim 7, wherein the matching in (c) is based on a distance between coordinates corresponding to the expected response and the geographic indicator being within the dynamic threshold.

12. The non-transitory computer readable medium of claim 7, wherein the geofence is smaller when the magnification level is increased.

13. A computing system for authenticating an electronic device comprising:
a memory configured to store instructions;
a processor, coupled to the memory, configured to processed the stored instructions to:
  (a) present, via the electronic device, a geographic map with a challenge based on a multi-factor authentication (MFA) process to log into an account, the challenge requiring a user to provide authentication input via the geographic map by marking a particular geographic location on the geographic map;
  (b) receive, from the electronic device, a geographic indicator marking the particular geographic location selected by the user;
  (c) authenticate the electronic device based on the geographic indicator matching an expected response based on the geographic indicator being within a dynamic threshold that is based on a magnification level;
  wherein the dynamic threshold is a computer-implemented geofence around the expected response.

14. The computing system of claim 13, wherein the processor is further configured to set the dynamic threshold based on the magnification level selected by the user.

15. The computing system of claim 14, wherein the magnification level is set by the user via a graphical user interface (GUI) presented on the electronic device.

16. The computing system of claim 15, wherein the processor is further configured to apply a further dynamic threshold based on an increased magnification level.

17. The computing system of claim 13, wherein the matching in (c) is based on a distance between coordinates corresponding to the expected response and the geographic indicator being within the dynamic threshold.

18. The computing system of claim 13, wherein:
the geofence is smaller when the magnification level is increased.

* * * * *